A. C. FARLEY.
AUTOMATIC LOCOMOTIVE ARRESTER.
APPLICATION FILED JULY 12, 1913.

1,151,170.

Patented Aug. 24, 1915.
2 SHEETS—SHEET 1.

A. C. FARLEY.
AUTOMATIC LOCOMOTIVE ARRESTER.
APPLICATION FILED JULY 12, 1913.

1,151,170.

Patented Aug. 24, 1915.
2 SHEETS—SHEET 2.

Witnesses

Inventor
Alfred C Farley,
By
his Attorney

UNITED STATES PATENT OFFICE.

ALFRED C. FARLEY, OF MARTINSBURG, WEST VIRGINIA.

AUTOMATIC LOCOMOTIVE-ARRESTER.

1,151,170.  Specification of Letters Patent.  Patented Aug. 24, 1915.

Application filed July 12, 1913. Serial No. 778,748.

*To all whom it may concern:*

Be it known that I, ALFRED C. FARLEY, a citizen of the United States, residing at Martinsburg, in the county of Berkeley and State of West Virginia, have invented certain new and useful Improvements in Automatic Locomotive-Arresters, of which the following is a specification.

This invention relates to an improved automatic locomotive arrester, and the primary object thereof is to provide positive and automatic means to be hereinafter fully described whereby accidents and disasters resulting from the carelessness on the part of an engineer may be reduced to the minimum.

A further object of the invention contemplates means, so disposed with respect to specially devised mechanism arranged upon a locomotive cab as to come into engagement therewith, such engagement automatically shutting off the locomotive steam supply and applying the pneumatic brake now generally used in connection with steam locomotives and other cars.

A still further object of the invention resides in the provision of a novel and peculiar operating lever or arm adapted to be arranged within the cab of a locomotive and connected to both the service valve and the throttle of the engine or locomotive for simultaneously operating the same and thereby arresting or stopping locomotives should the said arm be actuated.

The invention still further resides in the provision of an electric alarm adapted to be so connected to the engine throttle as to be sounded during the first application of the pneumatic brake mechanism, the sounding of the alarm warning the engineer of the close proximity of another train and serving as a danger signal for various other purposes.

The above and additional objects are accomplished by such means as are illustrated in the accompanying drawings, described in the following specification and then more particularly pointed out in the appended claims forming a part of this application.

In describing the invention in detail, reference will be had to the accompanying drawings, wherein like characters denote like or corresponding parts throughout the several views and in which:—

Figure 1:
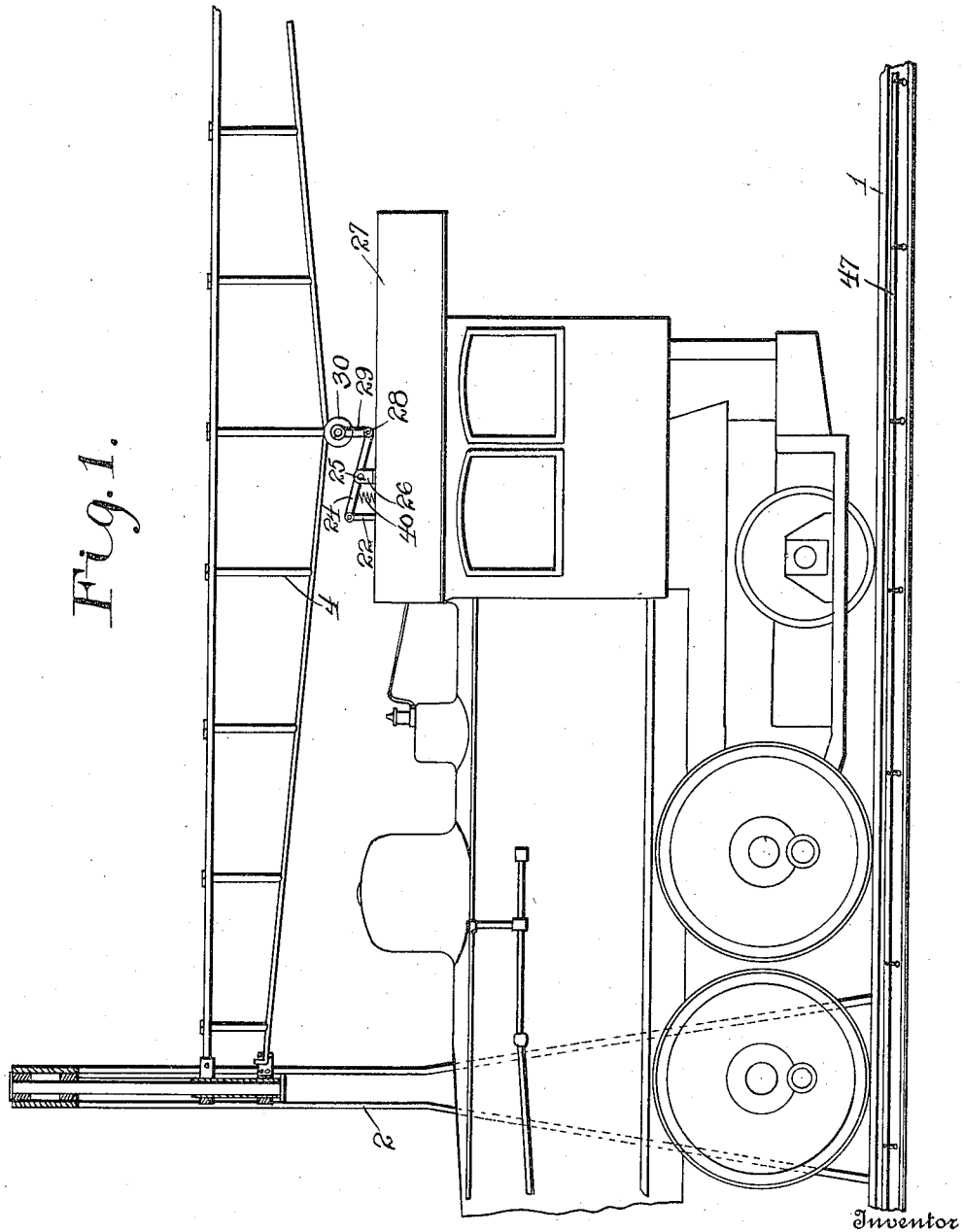
Figure 2:
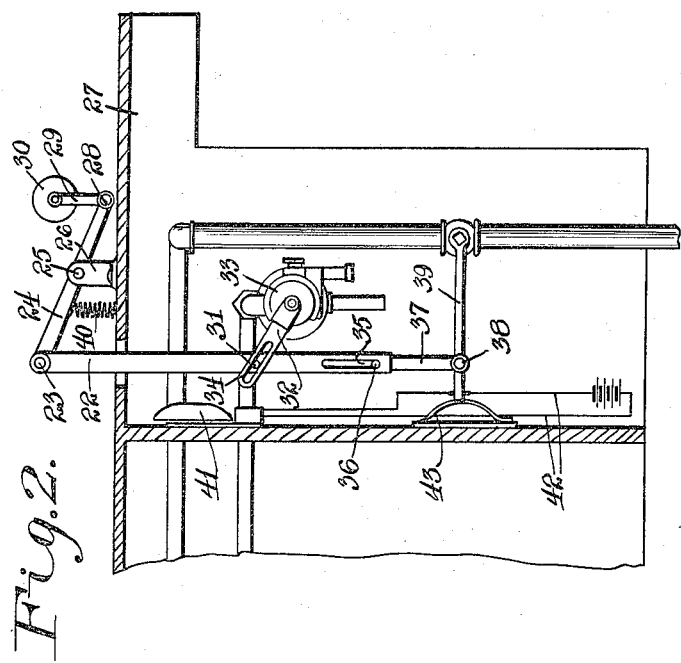

Figure 1 is an elevation partly broken away, parts being shown in section, illustrating the manner in which the brake mechanism coöperates with the operating means. Fig. 2 is a detail elevation, the locomotive cab being shown in section, of the mechanism employed for operating the service valve of the engine throttle.

Before proceeding with the description of the drawings, I desire to call particular attention to the fact that while I have evolved my invention and will hereinafter refer to the same as being particularly adapted to use in connection with steam locomotives, the same may be readily utilized, if desired, in connection with various other types of locomotives or engines.

Passing on to the description of the mechanism arranged upon the locomotive cab, for automatically applying the pneumatic brake mechanism and shutting off the steam supply, the same comprises an operating link 22 having one end pivotally connected as at 23 to a lever 24 fulcrumed as at 25 to lugs 26 mounted upon the top of the locomotive cab designated by the numeral 27. The opposite end of the lever 24 from that secured to the link 22 is pivotally secured as at 28 to a trolley harp 29 having a trolley wheel 30 mounted for rotation thereupon, the said wheel during the application of the invention being disposed in the path of the overhead rail 4 so as to permit the said wheel to engage the inclined face of the said rail and thereby rock or actuate the lever 24.

A pin 31 projects laterally from the link 22 over which a lever 32 of the brake valve 33 is arranged, the said lever having a slot 34 formed therein to permit movement of the latter during vertical movement of the link 22. The lower end of the said link 22 is provided with a slot 35 through which a pin 36 extends, the latter projecting laterally from a connecting lever 37 pivoted at its lower extremity as at 38 to the throttle 39 of the locomotive, the opposite or free end of the connecting lever 37 being embraced or inclosed within the link 22 as is clearly shown in Fig. 2 of the drawings. An expansion spring 40 is interposed between the lever 25 and the top of the cab 27 to return the former to its normal position after the trolley wheel 30 is withdrawn from engagement with the inclined surface of the overhead rail 4.

As a warning to the engineer of the approaching danger, an electric alarm bell 41 is arranged within the cab 27 the said alarm being connected to the throttle 39 through the medium of wires 42, the said throttle acting as an electric switch or conductor for the electric current when in closed position or when actuated by the link 22. To insure a retention of the said throttle 39 in operative position, a leaf spring 43 is arranged within the cab 27 in the path of the said throttle, the free end of the latter engaging the spring, the pressure of which retains the said throttle in the desired position.

Having thus fully described the construction and arrangement of the several parts comprising my invention, it now remains to set forth a little more in detail the operation of the same. The device comprising my invention is particularly adapted to use wherein the block signaling system is utilized. After a train or locomotive enters a certain block, the means for actuating the train carried control mechanism is operatively positioned in the path of the trolley wheel 30 carried by a second locomotive, should the latter enter the same block. As the trolley wheel 30 engages the said operating means (of which there are three), the link 22 is actuated causing the first application of the air brake to be effected by the movement of the lever 32 connected to the service valve, at the same time entirely cutting off the steam supply for operating the throttle 39 and forcing the free end thereof into engagement with the leaf spring 42 which engagement will retain the said throttle in closed position. As the trolley wheel 30 passes out of engagement with the first operating means, the spring 40 returns the link 22 to its normal position without opening the steam supply, that is to say, without returning the throttle 39 to its normal position. A continued forward movement of the locomotive causes the trolley wheel 30 to move into engagement with the second operating means thereby effecting a second application of the pneumatic brake mechanism, and, if this second application proves insufficient, a third application effected by the engagement between the trolley wheel 30 and the third operating means completely, positively and finally applies the pneumatic brakes thereby completely arresting the forward movement of the train. As the throttle 39 is actuated, the electric circuit for sounding the alarm 41 is closed causing the alarm to go off thereby warning the engineer of the approaching danger.

It will be seen from the above, taken in connection with the accompanying drawings, that the operation of the brake mechanism is to a certain extent gradual thus relieving the mechanism from the wear and tear that would be otherwise manifest were the brakes applied by a single application of the said mechanism; and that the arrangement of the connecting lever 37 with the link is such as to cause the latter to return to its normal position for a second and third application of the brake without returning the throttle 39 or causing the same to reopen the steam supply.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent is:

1. In combination with a locomotive having a brake valve and a throttle lever operable thereupon, a slotted link, a pin projecting from said link, a slotted arm engaging the pin, said arm having connection with said valve, an arm connected to the throttle lever, a pin projecting from said arm, said pin working within the slot of the link, an operating lever, one end of the lever being connected to said link, means engaging the lever to normally maintain the link in its uppermost position, and means actuatable to rock said lever and move said link to simultaneously operate said throttle lever and said valve, as and for the purpose set forth.

2. In combination with a locomotive having a brake valve and throttle lever operable thereupon, a link slotted at its lower end, a pin projecting from said link, a slotted arm engaging said pin, said arm having connection with said valve, an arm connected to the throttle lever, a pin projecting from said arm, said pin working within said first mentioned slot, a lever fulcrumed upon the top of the locomotive cab, one end of said lever being pivotally connected to said link, spring means engageable with said lever normally maintaining said link in its uppermost position, an extension upon the opposite end of said lever, a wheel carried by said extension, and means movable into and out of the path of said wheel to rock said lever and actuate said link to simultaneously operate said throttle lever and said valve, as and for the purpose set forth.

In testimony whereof I affix my signature in presence of two witnesses.

ALFRED C. FARLEY.

Witnesses:
E. M. AMICK,
ALBERT W. MILES.

Copies of this patent may be obtained for five cents each, by addressing the "Commissioner of Patents, Washington, D. C."